S. EDDY.
SILO MOLD.
APPLICATION FILED AUG. 24, 1914.

1,174,311.

Patented Mar. 7, 1916.
2 SHEETS—SHEET 1.

Witnesses
M. J. Haskell
Eva E. Williams

Inventor
Seth Eddy,
By Walter N. Haskell,
his Attorney

UNITED STATES PATENT OFFICE.

SETH EDDY, OF ERIE, ILLINOIS.

SILO-MOLD.

1,174,311.   Specification of Letters Patent.   Patented Mar. 7, 1916.

Application filed August 24, 1914. Serial No. 858,309.

*To all whom it may concern:*

Be it known that I, SETH EDDY, a citizen of the United States, residing at Erie, in the county of Whiteside and State of Illinois, have invented certain new and useful Improvements in Silo-Molds, of which the following is a specification.

My invention has reference to silos, and the manner of constructing the same, the purpose being to produce a silo of cylindrical shape which will be disposed in horizontal instead of the usual vertical position, and which is designed to be partially or entirely inclosed by the earth, except at one of its ends. By this means danger of the contents being injured or destroyed by action of the frost is precluded. The preferred form hereinafter shown and described is also provided with a central longitudinal partition, dividing the silo into two similar compartments, from one of which the ensilage may be removed without disturbing the contents of the other compartment.

Figure 1:
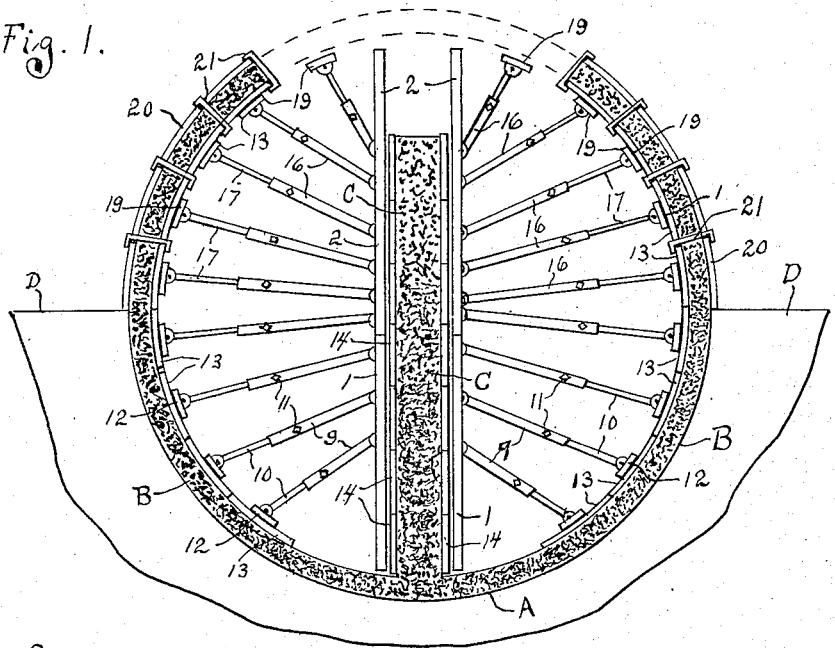
Figure 2:
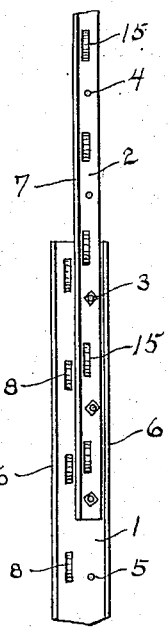
Figure 3:
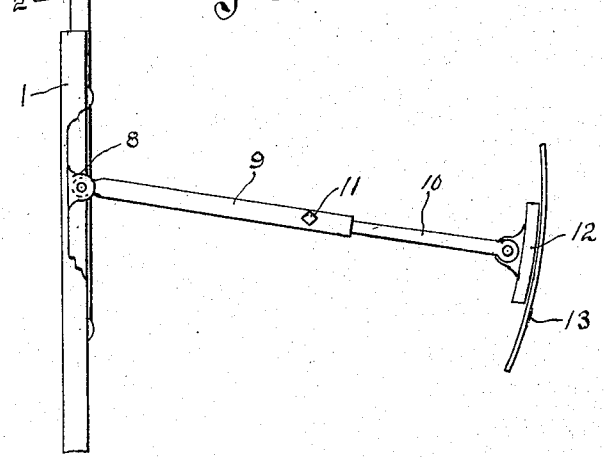
Figure 4:
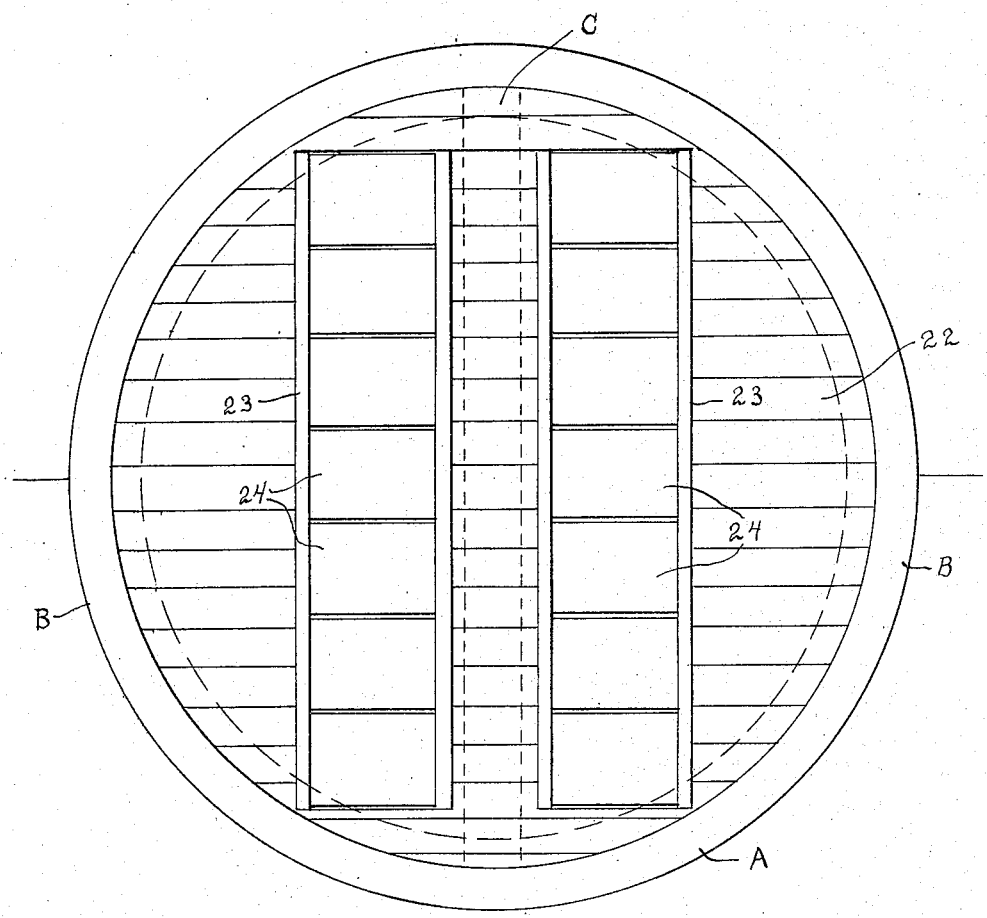

In the drawings: Figure 1 is a cross-section of a silo in process of construction, showing one of the temporary cross-frames used therein. Fig. 2 is an enlarged detail of the supports 1 and 2 at the point of union thereof. Fig. 3 is a similar view of one of the braces 9. Fig. 4 shows one end of the silo and closure therefor.

The silo is preferably formed partially under ground, and for this purpose an excavation of suitable form is made and the lower arc of the wall of the silo formed of concrete, as indicated at A. At intervals throughout the length of the excavation are mounted temporary frames consisting of uprights 1, connected with which are extensions 2, secured to the parts 1 by means of bolts 3 passing through two or more of a series of holes 4 in the plate 2, and similar openings 5 in the part 1. By this means the parts 1 and 2 are capable of vertical adjustment with reference to each other. The uprights 1 are provided with flanges 6, and the plates 2 with flanges 7, the part 1 being further provided with perforated lugs 8, to which are pivotally connected cylindrical braces 9, provided with telescopic sections 10, adapted to be held from movement by means of set-screws 11. At their outer ends the sections 10 are pivoted to shoes 12, by means of which plates or boards 13 are held in place, such plates forming the inner wall of the form within which is constructed that part of the silo wall indicated at B, the side of the excavation establishing the outer wall of the form.

The uprights 1 are arranged in pairs, spaced apart, so as to permit the construction of a central wall of concrete, as shown at C, the form therefor being provided by boards or plates 14 held in place by two or more of the posts 1 and extensions thereof. The wall C is carried upwardly coincidently with the construction of the outer walls of the silo.

The sections 2 are provided with series of perforated lugs 15, to which are pivotally connected braces 16, similar to the braces 9, and provided with extensible sections 17, pivoted at their outer ends to shoes 19, which hold in place the continuing form-plates 13, for the upper part of the structure. In forming that part of the silo which is above the surface of the ground, as indicated at D, it is necessary to use outer plates 20, connected with the plates 13 by means of bar hooks 21. The center wall C is raised to the full height of the silo, and the side walls brought upwardly until the circle is completed. The braces 9 and 16 are then loosened and the frames to which they are attached are removed through the end of the silo. The plates 13 and 14 are also removed, and can be used again in the building of additional silos.

After the silo is completed the upper exposed part thereof can be banked or covered with earth, so as to make the same entirely frost-proof. If possible to do so it is preferred to form the silo with one end against or into a hill or rise in the ground, the inner end being provided with a solid wall of cement, or such material as is desired to be used.

It will be apparent that the braces 9 and 16 act in both directions when in position, the outer ends thereof aiding in supporting the plates 13 and the inner ends preventing outward movement of the plates 14.

By having the plates 2 vertically adjustable upon the uprights 1 the frames can be used for silos of varying diameters, which would in practice approximate from ten to twenty feet. In the construction of the smaller sizes the inner ends of the braces 9 and 16 will pass each other without interference.

The outer end of the silo is inclosed by means of a barrier 22, (Fig. 4) provided on each side of the wall C with a vertical opening having frames 23 and removable doors 24. These doors may be provided with suitable fastening means and are of any desired construction, no novelty being claimed for this feature of the device.

Through the double construction of the silo it is possible to remove the contents from one side thereof without disturbing that of the other side, which can thereby be kept for a greater length of time on account of not having been exposed to the air. In the usual silo, upon the same being opened the entire contents thereof is exposed to the action of the air immediately.

What I claim as my invention, and desire to secure by Letters Patent of the United States, is:

In a device of the class described, a series of frames provided with vertically adjustable sections; a similar series of frames spaced apart from said first named series; sectional retaining walls held in spaced relation with each other between said series of frames, and adapted to receive a quantity of concrete to form a central wall for said silo; a plurality of braces externally and pivotally connected with each of said frames, and provided with extensible sections; shoes pivotally attached to the outer ends of said braces; and form-plates adapted to be held in place by said shoes, and provide a form for a silo wall.

In testimony whereof I affix my signature in presence of two witnesses.

SETH EDDY.

Witnesses:
ROBERT C. ADAMS,
REUBEN E. POTTER.

Copies of this patent may be obtained for five cents each, by addressing the "Commissioner of Patents, Washington, D. C."